(12) United States Patent
Shigenaga

(10) Patent No.: US 7,667,714 B2
(45) Date of Patent: Feb. 23, 2010

(54) PATTERNED POLYGON RENDERING APPARATUS

(75) Inventor: Satoshi Shigenaga, Uji (JP)

(73) Assignee: Panasonic Corporation, Osaka (JP)

( * ) Notice: Subject to any disclaimer, the term of this patent is extended or adjusted under 35 U.S.C. 154(b) by 705 days.

(21) Appl. No.: 11/342,876

(22) Filed: Jan. 31, 2006

(65) Prior Publication Data

US 2006/0170694 A1 Aug. 3, 2006

(30) Foreign Application Priority Data

Jan. 31, 2005 (JP) .......................... P2005-023808

(51) Int. Cl.
*G09G 5/00* (2006.01)
(52) U.S. Cl. ...................... 345/611; 345/581
(58) Field of Classification Search ........................ None
See application file for complete search history.

(56) References Cited

U.S. PATENT DOCUMENTS

| | | | | |
|---|---|---|---|---|
| 6,078,747 A * | 6/2000 | Jewitt | .......................... | 717/164 |
| 6,437,780 B1 * | 8/2002 | Baltaretu et al. | ............ | 345/423 |
| 6,646,647 B1 * | 11/2003 | Surgutchik et al. | .......... | 345/581 |
| 2004/0119709 A1 * | 6/2004 | Strom et al. | ................ | 345/421 |

FOREIGN PATENT DOCUMENTS

JP          6-301792          10/1994

* cited by examiner

*Primary Examiner*—Kee M Tung
*Assistant Examiner*—Jwalant Amin
(74) *Attorney, Agent, or Firm*—McDermott Will & Emery LLP

(57) ABSTRACT

A patterned polygon rendering apparatus has an edge dot attribute setting section 1 that assigns an attribute dot, which indicates an edge of a polygon, to respective dots located in an edge line of the polygon and stores the assigned attribute dots in work memory 2 on a per-dot basis, to thus perform edge processing; an internal attribute dot setting section 3 that assigns an attribute dot, which indicates the inside of the polygon, to respective dots located in an internal region of the polygon by reference to the work memory 2 and stores the assigned attribute dots into the work memory 2, to thus perform painting processing; and a pattern setting section 4 that sets edge color data to the dots assigned the attribute dots, which indicate the edges of the polygon, by reference to the work memory 2, sets pattern data to the dots assigned the attribute dots indicating the inside of the polygon, and renders the data stored in the work memory 2 to the frame memory 6, to thus perform pattern setting processing.

3 Claims, 14 Drawing Sheets

FIG. 3

| SECOND SIDE VECTOR | FIRST SIDE VECTOR | | | |
|---|---|---|---|---|
| | UP | DOWN | RIGHT | LEFT |
| UP | UP | DOWN | RIGHT | LEFT |
| DOWN | UP | DOWN | RIGHT | LEFT |
| RIGHT | UP | DOWN | RIGHT | LEFT |
| LEFT | UP | DOWN | RIGHT | LEFT |

APEX { ● : VERTICAL ATTRIBUTE DOT
       ◎ : HORIZONTAL ATTRIBUTE DOT

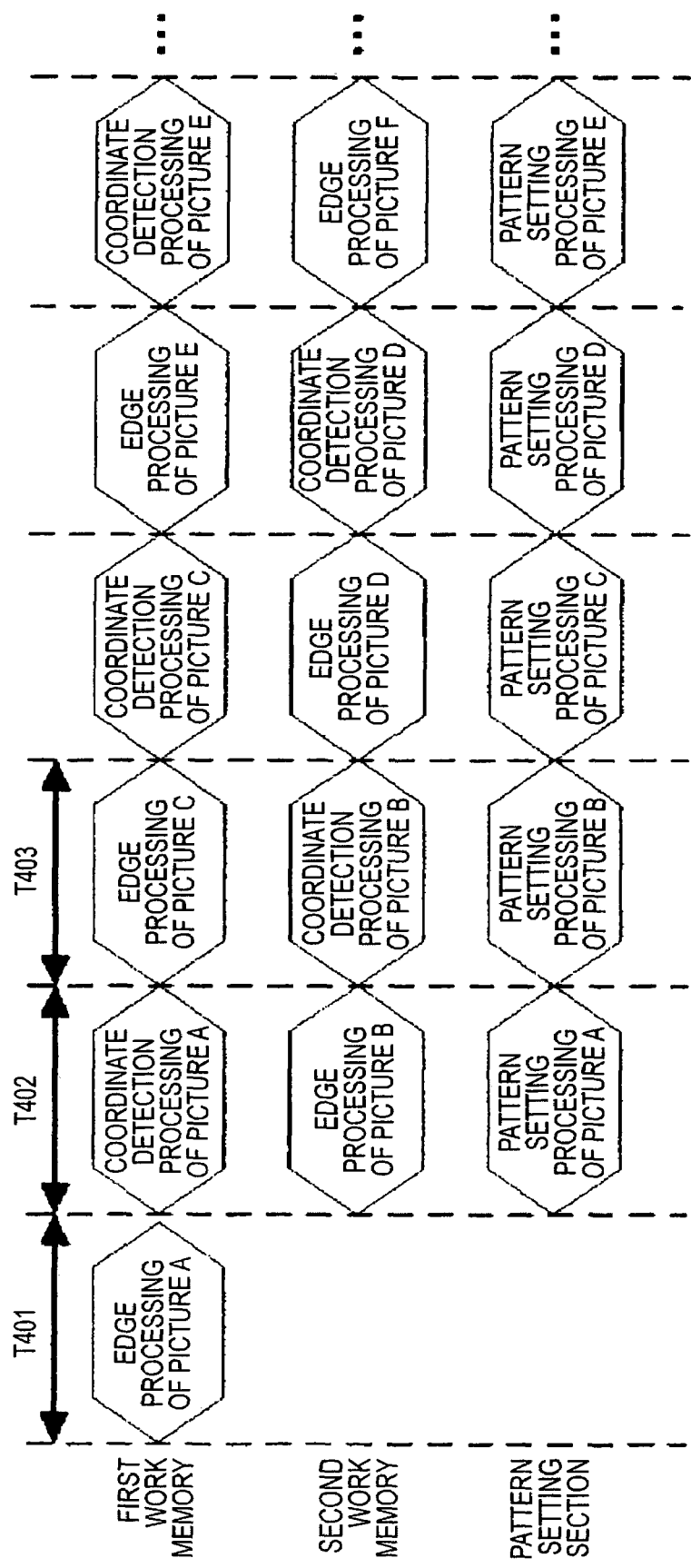

PATTERNED POLYGON RENDERING APPARATUS

BACKGROUND OF THE INVENTION

1. Field of the Invention

The present invention relates to a patterned polygon rendering apparatus, in the field of computer graphics, which pastes a pattern to a polygon of arbitrary shape, to thus perform painting.

2. Description of the Related Art

In recent years, a polygon having a pattern (hereinafter referred to as a "patterned polygon") has been extensively used for representing a green space or the sea, in a map display of a car navigation system. A conventionally-proposed method for rendering a patterned polygon is to divide a polygon into smaller polygons and to paste a texture, which is a pattern, to each of the thus-divided smaller polygons (see, e.g., JP-A-6-301792 (pp. 3 to 5, FIG. 1)).

However, the related-art method suffers a problem of heavy processing load for dividing a polygon into smaller polygons or computing reference coordinates of patterns assigned to the divided smaller polygons, or a problem of an increase in the number of memory write operations involving shorter transfer lengths, because the graphic divided into the smaller polygons becomes smaller in terms of the number of rendering pixels, thereby degrading rendering performance under influence of latency of memory access.

SUMMARY OF THE INVENTION

The present invention has been conceived in view of the circumstances of the related art and aims at providing a patterned polygon rendering apparatus capable of rendering a patterned polygon at high speed.

A patterned polygon rendering apparatus of the present invention includes:

attribute dot setting processing means which performs edge processing by means of assigning an attribute dot, indicating an edge of a polygon, to respective dots located on the outline of the polygon and storing the assigned attribute dots into work memory on a per-dot basis and which performs painting processing by means of assigning an attribute dot, indicating the inside of the polygon, to respective dots located in an internal region of the polygon by reference to the work memory and storing the assigned attribute dots into the work memory; and pattern setting processing means for performing pattern setting processing by means of setting edge color data for the dots assigned the attribute dots indicating the outline of the polygon, by reference to the work memory and setting pattern data to the dots assigned the attribute dots indicating the inside of the polygon, to thus render the data stored in the work memory in frame memory.

By means of the configuration, processing for dividing a polygon into smaller polygons and processing for computing reference coordinates of patterns corresponding to the thus-divided smaller polygons, which have been required conventionally, become obviated, and the transfer length over which data are written into memory is not divided to shorter lengths. For these reasons, a patterned polygon can be rendered at high speed.

In the patterned polygon rendering apparatus of the present invention, the attribute dot setting processing means and the pattern setting processing means perform processing of a plurality of pictures in parallel through use of a plurality of pieces of work memory.

Further, in the patterned polygon rendering apparatus of the present invention, while making reference to the work memory, the pattern setting processing means clears the work memory while scanning the same.

The patterned polygon rendering apparatus of the present invention further includes first work memory for effecting the edge processing; and second work memory for effecting the painting processing and the pattern setting processing, wherein the second work memory processes dots constituting the outline of the polygon and dots constituting the inside of the polygon as one bit per dot.

In the patterned polygon rendering apparatus of the present invention, when making reference to the work memory in the painting processing and the pattern setting processing, the attribute dot setting processing means and the pattern setting processing means clear the work memory while scanning the work memory.

A patterned polygon rendering apparatus of the present invention includes:

coordinate processing means which performs edge processing by means of assigning an attribute dot, indicating an edge of a polygon, to respective dots provided in edges of the polygon and storing the assigned attribute dots into work memory on a per-dot basis and which then performs coordinate detection processing by means of detecting rendering start coordinates and rendering end coordinates by reference to the work memory, to thus store detected coordinates into rendering coordinate storage means; and pattern setting processing means which reads pattern data from the pattern memory while rendering coordinates are taken as a reference address of pattern memory, where pattern data are stored, and which renders the pattern data in frame memory.

In the patterned polygon rendering apparatus of the present invention, the pattern setting processing means sets edge color data for dots corresponding to the attribute dots indicating the edges of the polygon, by reference to edge data storage means that stores edge data, which are in the work memory and correspond to the rendering start coordinates and the rendering end coordinates, to thus render the edge color data in the frame memory along with the pattern data.

The patterned polygon rendering apparatus of the present invention further includes means for storing, in numbers, the rendering start coordinates, the rendering end coordinates, and the edge data, respectively.

In the patterned polygon rendering apparatus of the present invention, an offset value is used for a two-dimensional address used when reference is made to the pattern memory on the basis of the rendering start coordinates.

In the patterned polygon rendering apparatus of the present invention, the coordinate processing means and the pattern setting processing means perform processing of a plurality of pictures in parallel through use of a plurality of the pieces of work memory.

In the patterned polygon rendering apparatus of the present invention, when making reference to the work memory, the coordinate processing means clears the work memory while scanning the same.

In the patterned polygon rendering apparatus of the present invention, the attribute dot indicating the edge of the polygon is a vertical attribute dot or a horizontal attribute dot; and the vertical attribute dot or the horizontal attribute dot is assigned to respective dots located in the edges of the polygon during edge processing such that the number of vertical attribute dots existing in an arbitrary scan line assumes 0 or an even number.

According to the patterned polygon rendering apparatus of the present invention, a polygon is plotted through use of attributes assigned to the respective dots constituting the polygon, thereby obviating processing for dividing a polygon into smaller polygons and processing for computing reference coordinates of patterns corresponding to the thus-divided smaller polygons, which have been required conventionally, and the transfer length over which data are written into memory is not divided into shorter lengths. For these reasons, a patterned polygon can be rendered at high speed.

BRIEF DESCRIPTION OF THE DRAWINGS

FIG. 3 is a view showing a rule pertaining to application of a dot attribute to an vertex.

FIG. 15 is a timing chart showing the flow of rendering processing of the patterned polygon rendering apparatus of the sixth embodiment of the present invention.

DESCRIPTION OF THE PREFERRED EMBODIMENTS

Figure 1:
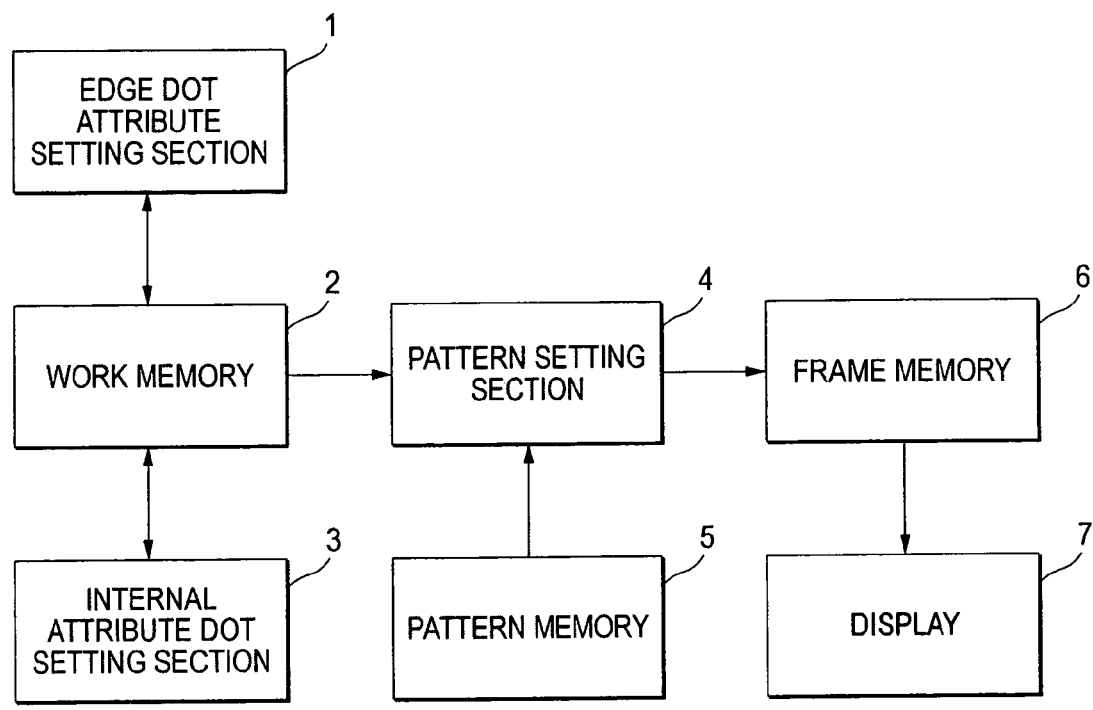
FIG. 1 is a block diagram showing the configuration of a patterned polygon rendering apparatus according to a first embodiment of the present invention.

Polygon rendering apparatus according to embodiments of the present invention will be described in detail hereinbelow by reference to the accompanying drawings. Throughout all the drawings used for describing embodiments, elements having the same functions are assigned the same reference numerals, and repeated explanations thereof are omitted.

First Embodiment

FIG. 1 is a block diagram showing the configuration of a patterned polygon rendering apparatus according to a first embodiment of the present invention. The patterned polygon rendering apparatus has an edge dot attribute setting section 1, work memory 2, an internal attribute dot setting section 3, a pattern setting section 4, pattern memory 5, frame memory 6, and a display 7.

The edge dot attribute setting section 1 is for assigning an attribute dot, which indicates an edge of a polygon, to each of dots provided along the edges of the polygon, and storing the thus-assigned attribute dot into the work memory 2 on a per-dot basis, to thus perform edge processing. The edge dot attribute setting section 1 performs setting of a vertical attribute dot or a horizontal attribute dot, which will be defined below, in relation to the dots provided along the edges of an arbitrary picture (polygon). The work memory 2 stores the attribute information assigned by the edge dot attribute setting section 1 or the internal attribute dot setting section 3, which will be described later, on a per-dot basis. The internal attribute dot setting section 3 assigns attribute dots, which indicate the inside of the polygon, to respective dots located in an internal region of the polygon by reference to the work memory 2 after edge processing has been performed, and stores the thus-assigned attribute dots into the work memory 2, to thus perform painting processing. An internal attribute dot, which will be described later, is set in a picture which is an object of painting.

The pattern setting section 4 sets edge color data for the dot assigned the attribute dot that represents the edge of the polygon, by reference to the work memory 2 where the attribute dot is stored; sets pattern data for the dot assigned the attribute dot that indicates the inside of the polygon; and renders the data stored in the work memory 2 into the frame memory 6, to thus perform pattern setting processing. By reference to the work memory 2, the pattern setting section 4 sets edge color data for the dot corresponding to the edges and the pattern data for the dot corresponding to the inside of the picture, thereby writing the data into an address corresponding to the coordinates of a rendering target in the frame memory 6. The pattern memory 5 stores the pattern data to which the pattern setting section 4 makes reference.

The frame memory 6 stores rendering data for one screen. The display 7 displays a picture on the basis of the data stored in the frame memory 6.

In the above-described configuration, the pattern memory 5 may be formed from ROM or rewritable RAM.

Before the edge dot attribute setting section 1 makes access to the work memory 2, the work memory 2 must have been cleared. However, when the pattern setting section 4 makes reference to the work memory 2, reference does not need to be made to the same data again. So long as the work memory 2 is cleared while reference is being made thereto, processing of the next picture to be rendered, which is to be performed by the edge dot attribute setting section 1, can be commenced promptly.

Rendering operation of the patterned polygon rendering apparatus having the above configuration will now be described.

Figure 2:
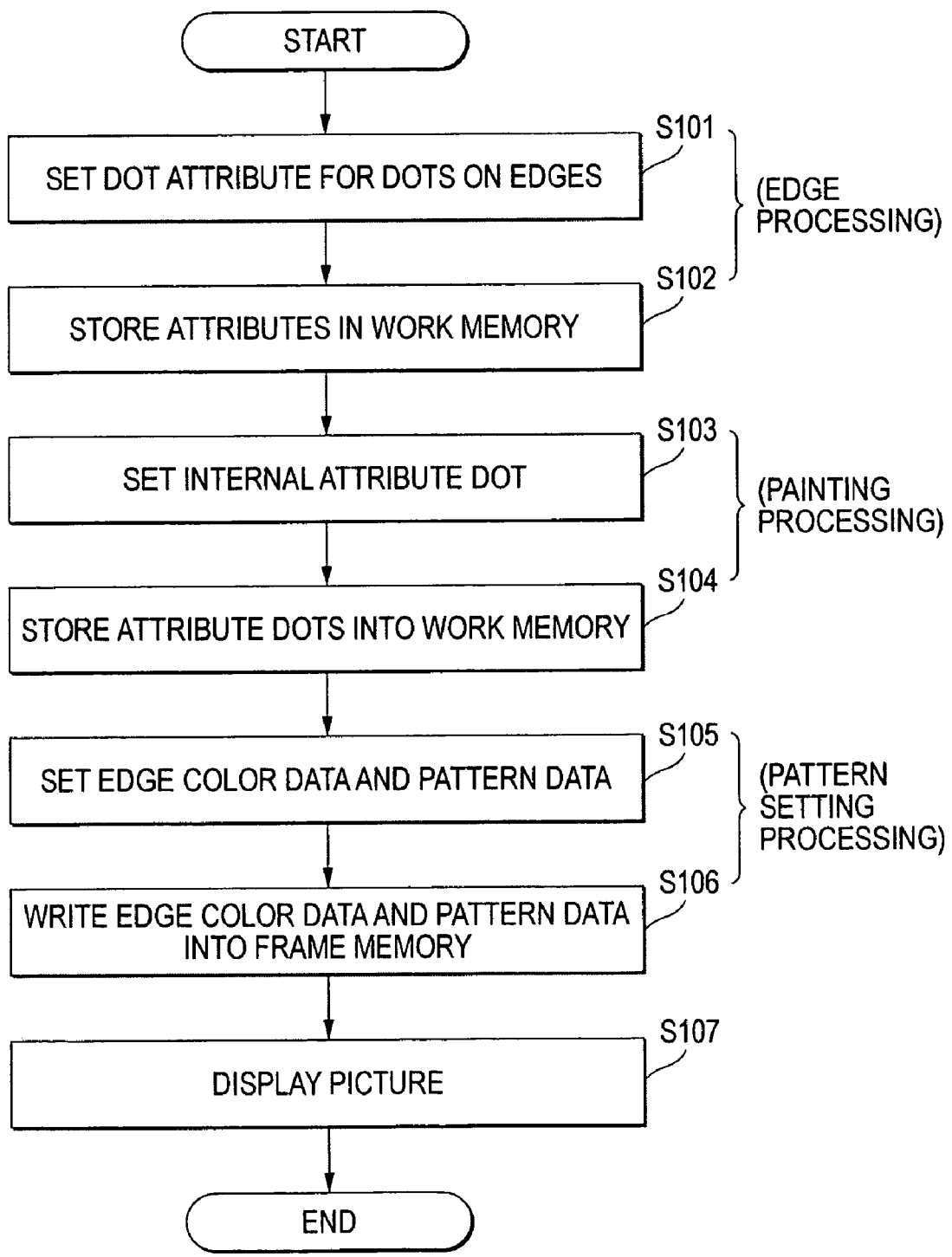
FIG. 2 is a flowchart showing procedures of rendering operation of the patterned polygon rendering apparatus of the first embodiment of the present invention.

FIG. 2 is a flowchart showing procedures of rendering operation of the patterned polygon rendering apparatus according to the first embodiment of the present invention. To begin with, the edge dot attribute setting section 1 performs setting of a vertical attribute dot or a horizontal attribute dot, which will be defined below, for each of the dots provided along the edges of the picture (step S101). Specifically, the vertical attribute dot or the horizontal attribute dot is assigned such that the number of vertical attribute dots existing in an arbitrary scan line inevitably assumes zero or an even number. A specific technique for doing this will be described below.

First, the X-axis displacement of an edge is taken as dx and the Y-axis displacement of an edge is taken as dy, and a side vector of the edge is classified into four categories; namely, UP, DOWN, RIGHT, and LEFT, wherein UP is taken for the case of dy>0, DOWN is taken for the case of dy<0, RIGHT is taken for the case of dy=0 and dx>0, and LEFT is taken for the case of dy=0 and dx<0.

FIG. 3 is a view showing a rule applied to assignment of a dot attribute to an vertex. A first side vector is defined by means of taking an vertex of interest as an end point and an immediately preceding vertex as a start point. A second side vector is defined by means of taking the vertex of interest as a start point and the next vertex as an endpoint. A vertical attribute dot or a horizontal attribute dot is imparted to the vertex of interest in accordance with the direction of the first side vector and that of the second side vector. In the drawing, a dotted arrow denotes the direction of the first side vector, and a solid arrow denotes the direction of the second side vector. As illustrated, for instance, when the direction of the first side vector denotes UP and the direction of the second side vector denotes UP, a vertical attribute dot is assigned to the vertex of interest. When the direction of the first side vector denotes DOWN and the direction of the second side vector denotes RIGHT, the horizontal attribute dot is assigned to the vertex of interest.

Next, attention is sequentially paid to a plurality of dots provided along the edge between the vertexes. When the Y coordinate of a dot of interest differs from the Y coordinate of an immediately preceding dot and when the Y coordinate of the dot of interest differs from the Y coordinate of an end point on the edge, the vertical attribute dot is assigned to the dot of interest. In other cases, the horizontal attribute dot is assigned to the dot of interest.

The work memory 2 stores the attributes assigned by the edge dot attribute setting section 1 on a per-dot basis (step S102). Specifically, edge processing is performed in steps S101 and S102.

In a polygon of arbitrary shape, an edge overlaps another edge. For this reason, when the edge dot attribute setting section 1 attempts to newly assign to a dot the vertical attribute dot or the horizontal attribute dot, the horizontal attribute dot is assigned if the attribute of the dot coincides with the dot attribute stored in the work memory 2. In other cases, the vertical attribute dot is assigned. Thereby, setting of an attribute dot can be performed in consideration of an overlap between edges.

Figure 4:
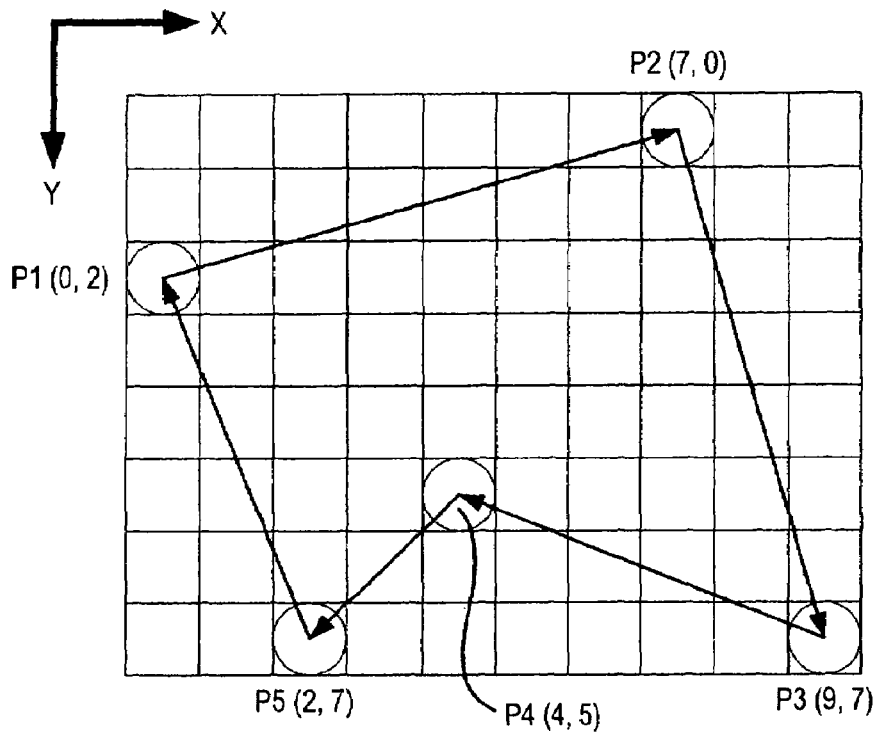
FIG. 4 is a view showing a specific example of a picture which is to be an object of rendering.

FIG. 4 is a view showing a specific example of a picture which is to be an object of rendering. P1 to P5 in the drawing denote vertexes in the picture. As illustrated, the edge dot attribute setting section 1 assigns the vertical attribute dot or the horizontal attribute dot to each of the dots existing along the edges, and the attribute information pertaining to the dots along the edges of the picture is written into the work memory 2.

Next, the internal attribute dot setting section 3 sets an internal attribute dot in relation to a dot in the picture that is an object of painting (step S103). Specifically, a scan is performed on the inside of a rectangle circumscribing the target picture for each Y-coordinate in the positive direction of the X-coordinate axis. Moreover, attention is sequentially paid to a plurality of scan lines in the direction of the X-coordinate axis, and internal attribute dots are set for all the dots, excluding the vertical attribute dots and the horizontal attribute dots, of the dots located between an odd-numbered vertical attribute dot and the next even-numbered vertical attribute dot, which are located along the scan line of interest. The work memory 2 stores internal attribute dots set by the internal attribute dot setting section 3 (step S104) Specifically, painting processing is performed in steps S103 and S104.

Figure 5:
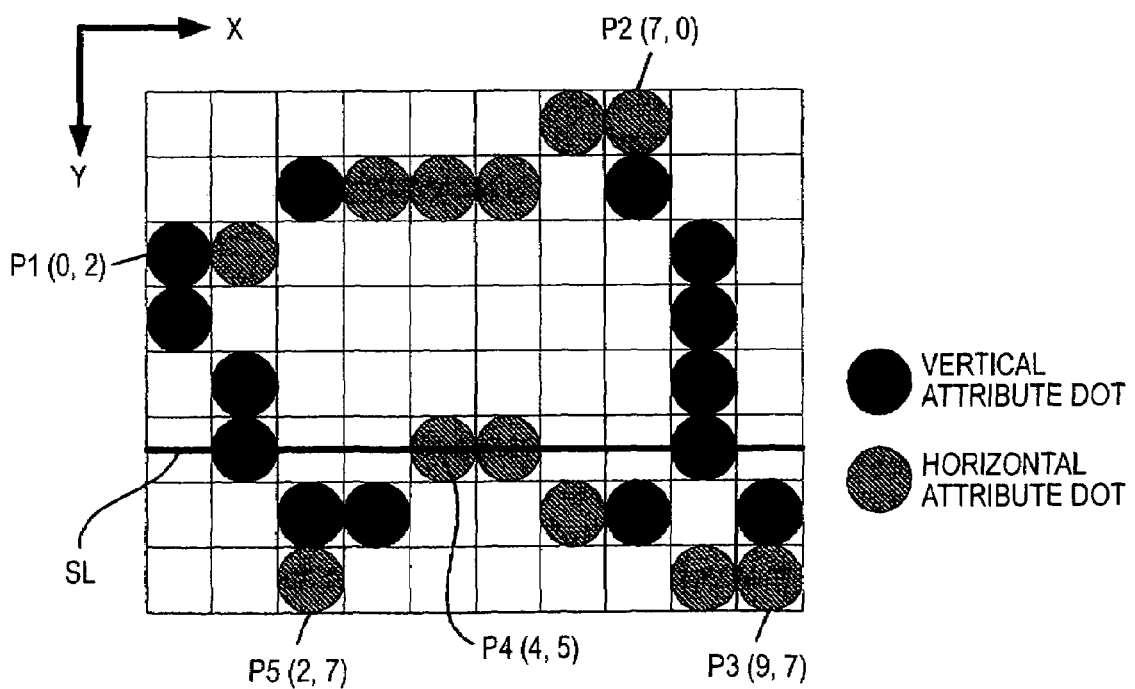
FIG. 5 is a view showing an overview of internal attribute dot setting procedures.
Figure 6:
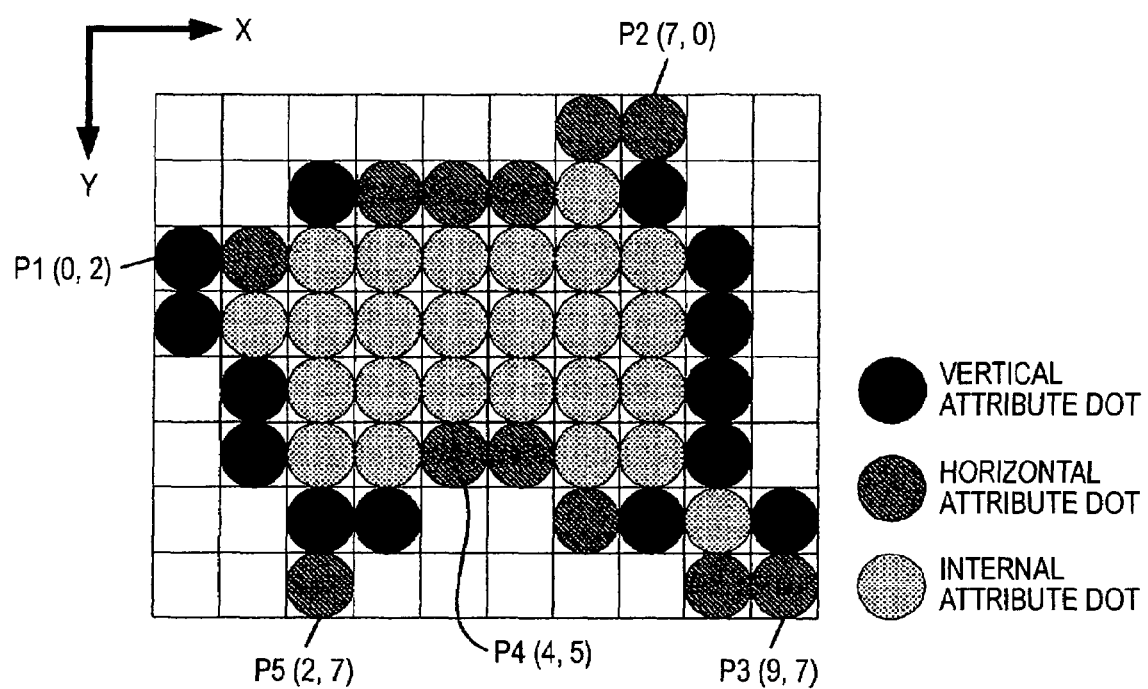
FIG. 6 is a view showing dot attributes in the picture after an internal attribute dot has been set for all dots.

FIG. 5 is a view showing the overview of internal attribute dot setting procedures. In the case of a scan line SL illustrated in the drawing, the internal attribute dot is set for each of four dots located at coordinates (2, 5), (3, 5), (6, 5), and (7, 5). FIG. 6 is a view showing dot attributes in the picture after the internal attribute dot has been set for all the dots. The work memory 2 records attribute information of these dots.

Next, by means of making reference to the work memory 2 after the internal attribute dot has been set for all the dots, the pattern setting section 4 sets edge color data for the dots corresponding to the vertical attribute dots and the horizontal attribute dots, and sets pattern data, for which reference has been made to the pattern memory 5 where pattern data have been stored in advance, for the dots corresponding to the internal attribute dots (step S105). Data are written into the address corresponding to the coordinates of the rendering target in the frame memory 6 (step S106). Specifically, pattern setting processing is performed in steps S105 and S106. Finally, the display 7 displays a picture on the basis of the data stored in the frame memory 6 (step S107).

When the size of the pattern data stored in the pattern memory 5 is smaller than the size of the rectangle circumscribing the picture to be rendered, rendering is carried out by repetition of the pattern data.

As has been described, according to the present embodiment, rendering is performed on the basis of the attribute information about the edges forming the picture and the attribute information about the dots included within the edges. As a result, processing for dividing a polygon into smaller polygons and processing for computing reference coordinates of patterns corresponding to the thus-divided smaller polygons, which have been required conventionally, become obviated, and the transfer length over which data are written into memory is not divided to shorter lengths. For these reasons, a patterned polygon can be rendered at high speed.

Second Embodiment

Figure 7:
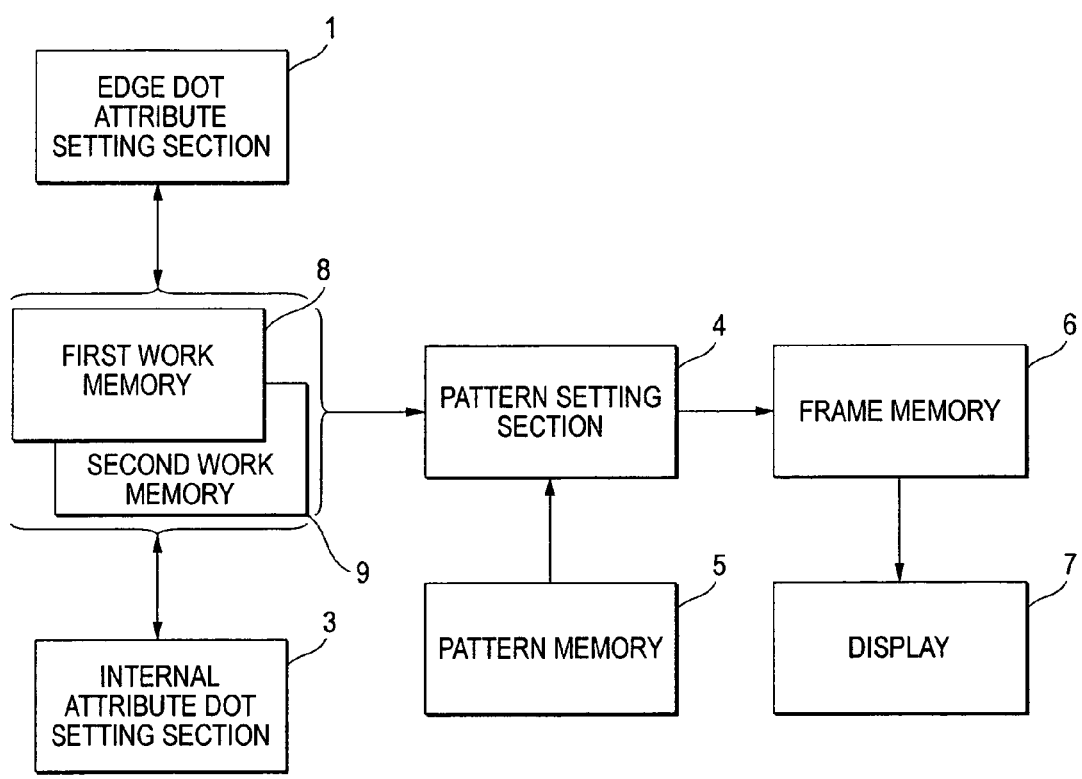
FIG. 7 is a block diagram showing the configuration of a patterned polygon rendering apparatus according to a second embodiment of the present invention.

A patterned polygon rendering apparatus which performs rendering processing through use of two types of work memory will now be described. FIG. 7 is a block diagram showing the configuration of the patterned polygon rendering apparatus of the second embodiment of the present invention. The present embodiment differs from the first embodiment in that the work memory 2 is increased to two types of memory; namely, first work memory 8 and second work memory 9. The edge dot attribute setting section 1, the internal attribute dot setting section 3, and the pattern setting section 4 can make access to the first work memory 8 and the second work memory 9. In terms of the remaining configuration and procedures of rendering operation, the second embodiment is identical with the first embodiment, and hence further explanations are omitted.

In the present embodiment, as a result of provision of two pieces of frame memory, rendering operation can be carried out in parallel for two pictures.

Figure 8:
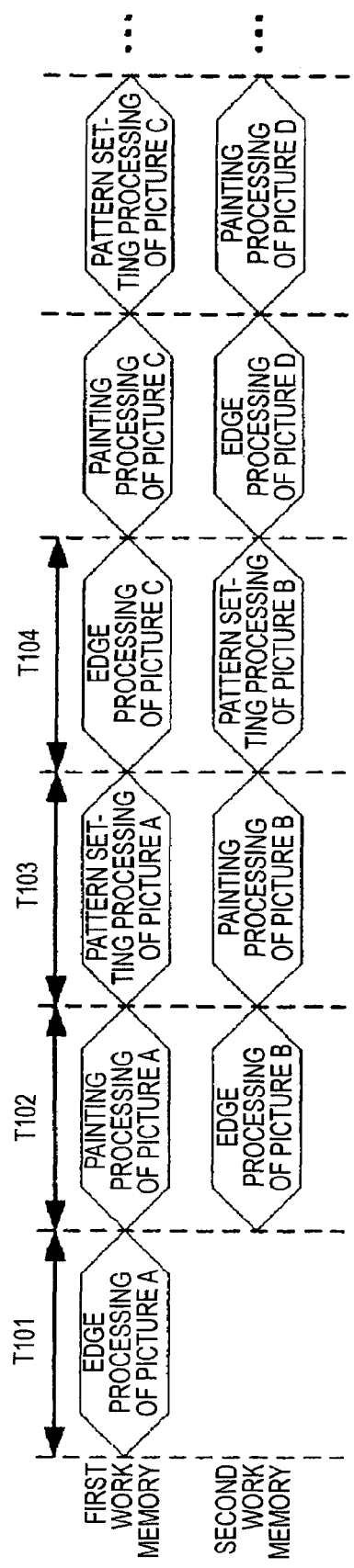
FIG. 8 is a timing chart showing the flow of rendering processing of the patterned polygon rendering apparatus of the second embodiment of the present invention.

FIG. 8 is a timing chart showing the flow of rendering processing of the patterned polygon rendering apparatus of the second embodiment of the present invention. Arbitrary, different pictures are displayed as being distinguished from each other as Picture A, Picture B, and Picture C.

First, the edge dot attribute setting section 1 performs edge processing of Picture A in relation to the first work memory 8 (T101). Next, the internal attribute dot setting section 3 performs painting processing, by means of which an internal attribute dot is set for dots constituting the inside of Picture A, in relation to the first work memory 8 that has completed edge processing of Picture A (T102). Concurrently, the edge dot attribute setting section 1 performs edge processing of Picture B in relation to the second work memory 9 (T102).

The pattern setting section 4 performs pattern setting processing, by means of which edge color data and pattern data are set for the respective dots constituting Picture A in relation to the first work memory 8 that has completed painting processing of Picture A, and the data are written into the frame memory 6 (T103). A series of rendering processing operations for Picture A is now completed. Concurrently, the internal attribute dot setting section 3 performs painting processing of Picture B in relation to the second work memory 9 that has completed edge processing of Picture B (T103).

Next, the edge dot attribute setting section 1 performs edge processing of Picture C in relation to the first work memory 8 that has completed pattern setting processing of Picture A (T104). Concurrently, the pattern setting section 4 performs pattern setting processing of Picture B in relation to the second work memory 9 that has completed painting processing of Picture B (T104). A round of rendering processing of Picture B is now completed.

In subsequent steps, rendering processing of two pictures is concurrently performed in parallel along the same flow.

So long as the pattern setting section 4 clears the first work memory 8 and the second work memory 9 while making reference to the first work memory 8 and the second work memory 9, edge processing of the next picture to be rendered can be started promptly.

As mentioned above, according to the present embodiment, two pictures can be processed in parallel through use of two pieces of work memory, so that a patterned polygon can be rendered at high speed.

Third Embodiment

Next will be described a patterned polygon rendering apparatus which uses two types of work memory by distinguishing the two pieces of work memory from each other as work memory for effecting edge processing (dedicated for edge processing) and work memory for effecting painting processing and pattern setting processing (dedicated for painting processing and pattern setting processing). Since the internal configuration of the apparatus and the procedures of rendering processing are the same as those of the second embodiment, their explanations are omitted.

In the present embodiment, the first work memory 8 is used as being dedicated for edge processing, and the second work memory 9 is used as being dedicated for painting processing and pattern setting processing. Dot attributes handled by the first work memory 8 usually include four types of attributes; namely, a "state of nothing (i.e., a bit value=00)," a "vertical attribute (i.e., a bit value=11)," a "horizontal attribute (i.e., a bit value=10)," and an "internal attribute (i.e., a bit value=01) ." Two bits are allocated to one dot. Dot attributes handled by the second work memory 9 of the configuration described in connection with the present embodiment includes two types; namely, a "state of nothing (i.e., a bit value=0)" and the "internal attribute (i.e., a bit value=1), and one bit can be allocated to one dot.

The internal attribute dot setting section 3 scans the first work memory 8 dedicated for edge processing. Of the dots located between the odd-numbered vertical attribute dot and the next even-numbered vertical attribute dot, both of which are provided along the scan line of interest, internal attribute dots (i.e., a bit value of 1) are set for all the dots including the vertical attribute dots and the horizontal attribute dots, and stores the dots into the second work memory 9.

The pattern setting section 4 makes reference to the second work memory 9 after the internal attribute dot (i.e., abit value of 1) has been set for all the dots; sets the pattern data to the dots corresponding to the internal attribute dots (i.e., a dot value of 1); and writes the pattern data into the frame memory 6.

Figure 9:
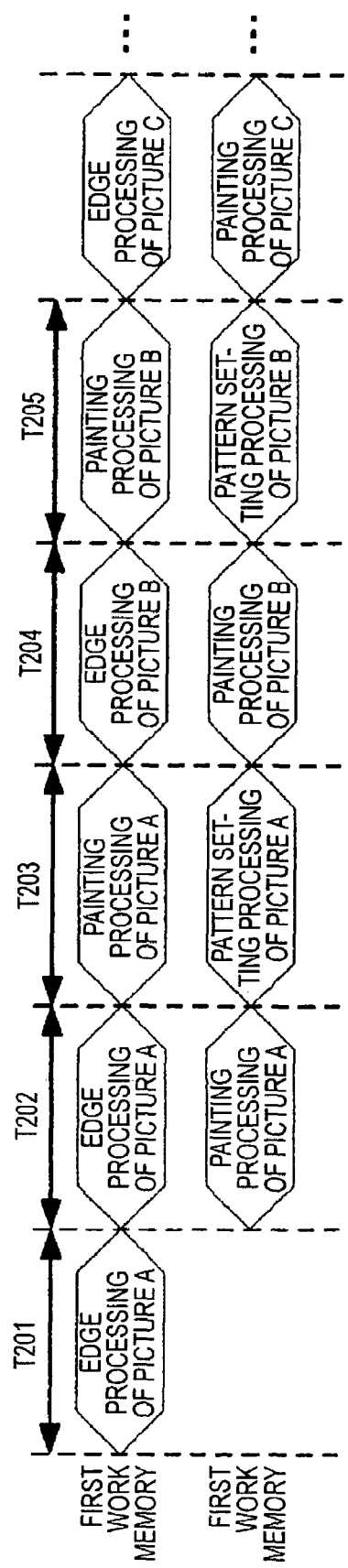
FIG. 9 is a timing chart showing the flow of rendering processing of a patterned polygon rendering apparatus of a third embodiment of the present invention.

FIG. 9 is a timing chart showing the flow of rendering processing of a patterned polygon rendering apparatus according to a third embodiment of the present invention. To begin with, the edge dot attribute setting section 1 performs edge processing of Picture A in relation to the first work memory 8 (T201).

Next, the internal attribute dot setting section 3 performs painting processing, by means of which the internal attribute dot is set for the dots constituting the inside of Picture A, in relation to the second work memory 9 while scanning the first work memory 8 that has completed edge processing of Picture A (T202).

The pattern setting section 4 performs pattern setting processing, by means of which pattern data are set for the respective dots constituting Picture A, in relation to the second work memory 9 that has completed painting processing of Picture A, and the pattern data are written into the frame memory 6 (T203). A round of rendering processing of Picture A is now completed. Concurrently, the edge dot attribute setting section 1 performs edge processing of Picture B in relation to the first work memory 8 (T203).

The internal attribute dot setting section 3 performs painting processing of Picture B in relation to the second work memory 9 while scanning the first work memory 8 that has completed edge processing of Picture B (T204).

The pattern setting section 4 performs pattern setting processing of Picture B in relation to the second work memory 9 that has completed painting processing of Picture B (T205). A series of rendering processing operations of Picture B is now completed. Concurrently, the edge dot attribute setting section 1 performs edge processing of Picture C in relation to the first work memory 8 (T205).

In subsequent steps, rendering processing of two pictures is simultaneously performed in parallel along the same flow.

So long as the internal attribute dot setting section 3 clears the first work memory 8 while making reference to the same, edge processing of the next picture to be rendered can be commenced immediately. Further, so long as the pattern setting section 4 clears the second work memory 9 while making reference to the second work memory 9, painting processing of the next picture to be rendered can be started promptly in the same fashion.

As mentioned above, according to the present embodiment, two pieces of work memory are taken as work memory dedicated for edge processing and work memory dedicated for painting and pattern setting processing, respectively. Hence, when the color of edges is not required, the capacity of the work memory dedicated for painting and pattern setting processing can be made one-half, thereby enabling miniaturization of a circuit.

Fourth Embodiment

Figure 10:
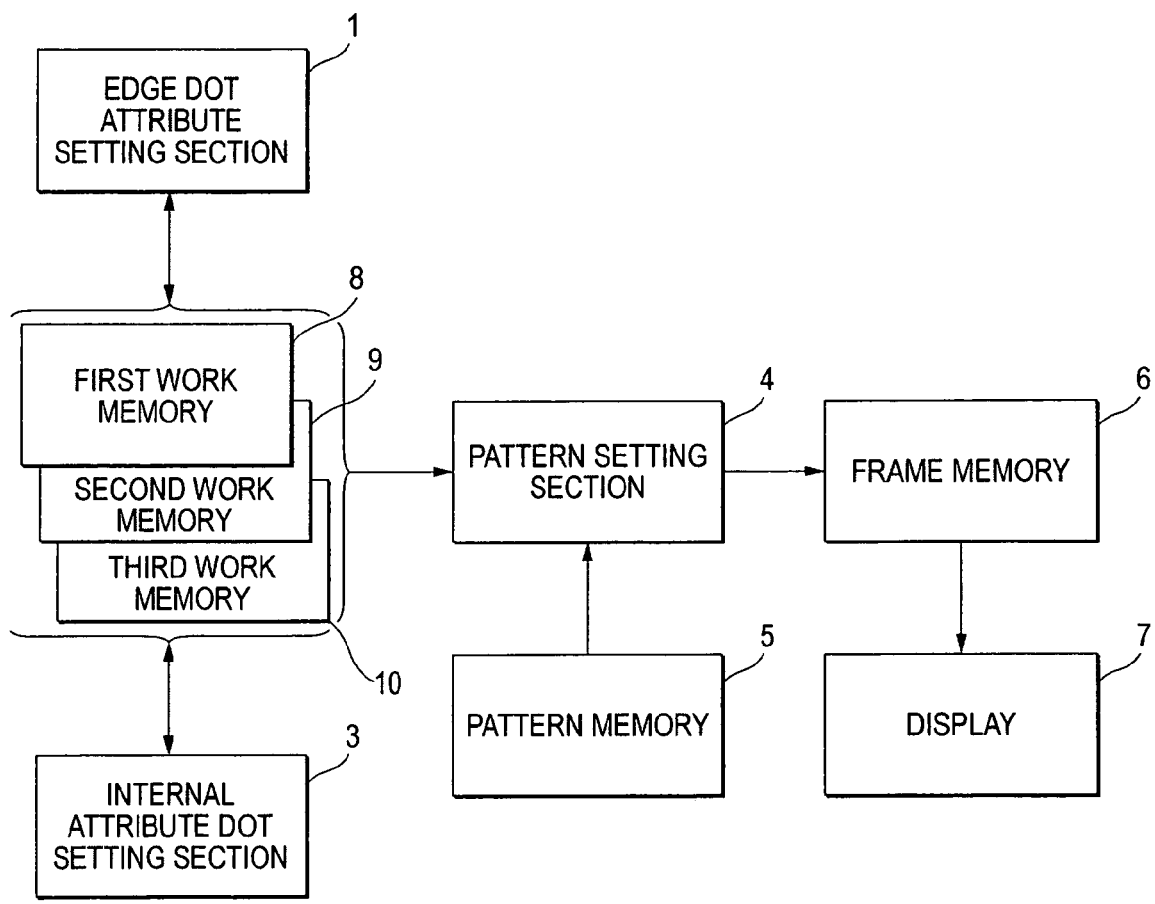
FIG. 10 is a block diagram showing the configuration of a patterned polygon rendering apparatus of a fourth embodiment of the present invention.

Next will be described a patterned polygon rendering apparatus which performs rendering processing through use of three types of work memory. FIG. 10 is a block diagram showing the configuration of a patterned polygon rendering apparatus according to a fourth embodiment of the present invention. The present embodiment differs from the second embodiment in that third work memory 10 is added to the first work memory 8 and the second work memory 9. The edge dot attribute setting section 1, the internal attribute dot setting section 3, and the pattern setting section 4 can make access to the first work memory 8, the second work memory 9, and the third work memory 10. Since the internal configuration of the apparatus and the procedures of rendering processing are the same as those of the second embodiment, their explanations are omitted.

Figure 11:
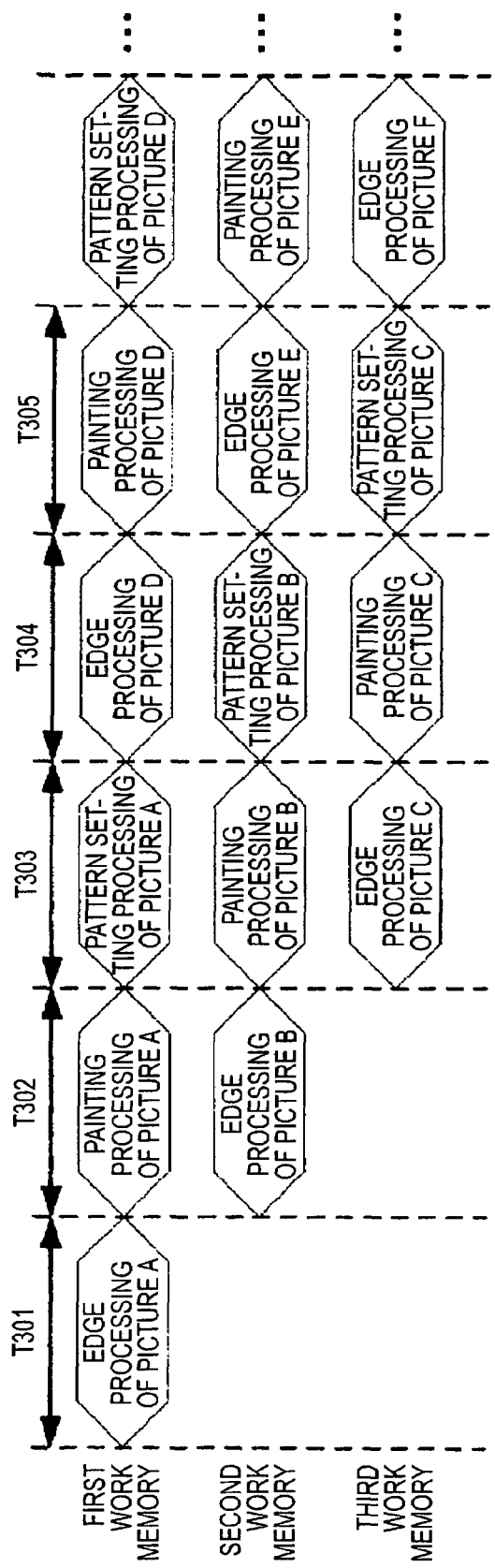
FIG. 11 is a timing chart showing the flow of rendering processing of the patterned polygon rendering apparatus of the fourth embodiment of the present invention.

In the present embodiment, three pieces of frame memory are provided, whereby rendering processing of three pictures can be performed concurrently. FIG. 11 is a timing chart showing the flow of rendering processing of a patterned polygon rendering apparatus according to a fourth embodiment of the present invention.

First, the edge dot attribute setting section 1 performs edge processing of Picture A in relation to the first work memory 8 (T301).

Next, the internal attribute dot setting section 3 performs painting processing, by means of which an internal attribute dot is set for dots constituting the inside of Picture A, in relation to the first work memory 8 that has completed edge processing of Picture A (T302). Concurrently, the edge dot attribute setting section 1 performs edge processing of Picture B in relation to the second work memory 9 (T302).

Next, the pattern setting section 4 performs pattern setting processing, by means of which edge color data and pattern data are set for the respective dots constituting Picture A, in relation to the first work memory 8 that has completed painting of Picture A, and the pattern data are written into the frame memory 6 (T303). A round of rendering processing of Picture A is now completed. Concurrently, the internal attribute dot setting section 3 performs painting processing of Picture B in relation to the second work memory 9 that has completed edge processing of Picture B (T303). Further simultaneously, the edge dot attribute setting section 1 performs edge processing of Picture C in relation to the third work memory 10 (T303).

Next, the edge dot attribute setting section 1 performs edge processing of Picture D in relation to the first work memory 8 that has completed pattern setting processing of Picture A (T304). Concurrently, the pattern setting section 4 performs pattern setting processing of Picture B in relation to the second work memory 9 that has completed painting processing of Picture B (T304). A round of rendering processing of Picture B is now completed. Concurrently, the internal attribute dot setting section 3 performs painting processing of Picture C in relation to the third work memory 10 that has completed edge processing Picture C (T304).

The internal attribute dot setting section 3 performs painting processing of Picture D in relation to the first work memory 8 that has completed edge processing of Picture D (T305). Simultaneously, the edge dot attribute setting section 1 performs edge processing of Picture E in relation to the first work memory 8 that has completed pattern setting processing of Picture B (T305). Moreover, the pattern setting section 4 concurrently performs pattern setting processing of Picture C in relation to the third work memory 10 that has completed painting processing of Picture C (T305). A round of rendering processing of Picture C is now completed.

In subsequent steps, rendering processing of three pictures is concurrently performed in parallel along the same flow.

So long as the pattern setting section 4 clears the first work memory 8 while making reference to the first work memory 8, the second work memory 9, and the third work memory 10, edge processing of the next picture to be rendered can be started promptly.

As mentioned above, according to the present embodiment, three pictures can be processed in parallel through use of three pieces of work memory, and hence a patterned polygon can be rendered at high speed.

Fifth Embodiment

Figure 12:
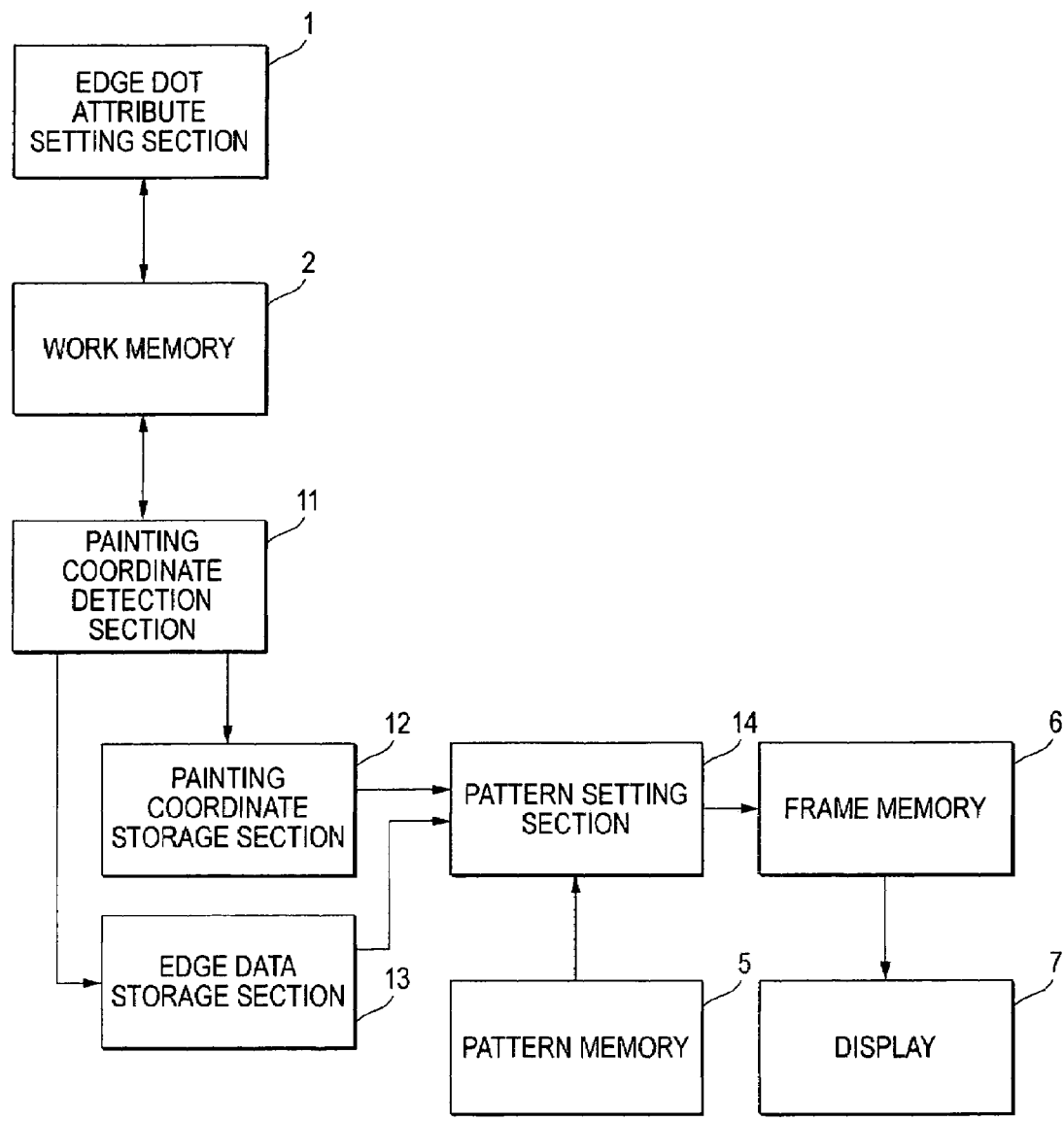
FIG. 12 is a block diagram showing the configuration of a patterned polygon rendering apparatus of a fifth embodiment of the present invention.

There will now be described a patterned polygon rendering apparatus which effects rendering through use of rendering start coordinates and rendering end coordinates rather than individual dot information. FIG. 12 is a block diagram showing the configuration of a patterned polygon rendering apparatus according to a fifth embodiment of the present invention. The present embodiment differs from the first embodiment in that a painting coordinate detection section 11, a painting coordinate storage section 12, and an edge data storage section 13 are additionally provided in lieu of the internal attribute dot setting section 3.

The painting coordinate detection section 11 performs coordinate detection processing by means of detecting rendering start coordinates and rendering end coordinates by reference to the work memory 2, painting the detected coordinates, and storing the coordinates in the painting coordinate storage section 12; and detects coordinates of an area, where all dots including vertical attribute dots, horizontal attribute dots, and internal attribute dots are consecutively present, on every scan line. The painting coordinate storage section 12 stores the coordinate data detected by the painting coordinate detection section 11. Moreover, the edge data storage section 13 stores coordinate data corresponding to edges, among the coordinate data detected by the painting coordinate detection section 11, as required. In other respects, the configuration of the patterned polygon rendering apparatus is identical with that of the first embodiment, and hence further explanation is omitted.

Rendering operation of the patterned polygon rendering apparatus having the above-described configuration will now be described.

Figure 13:
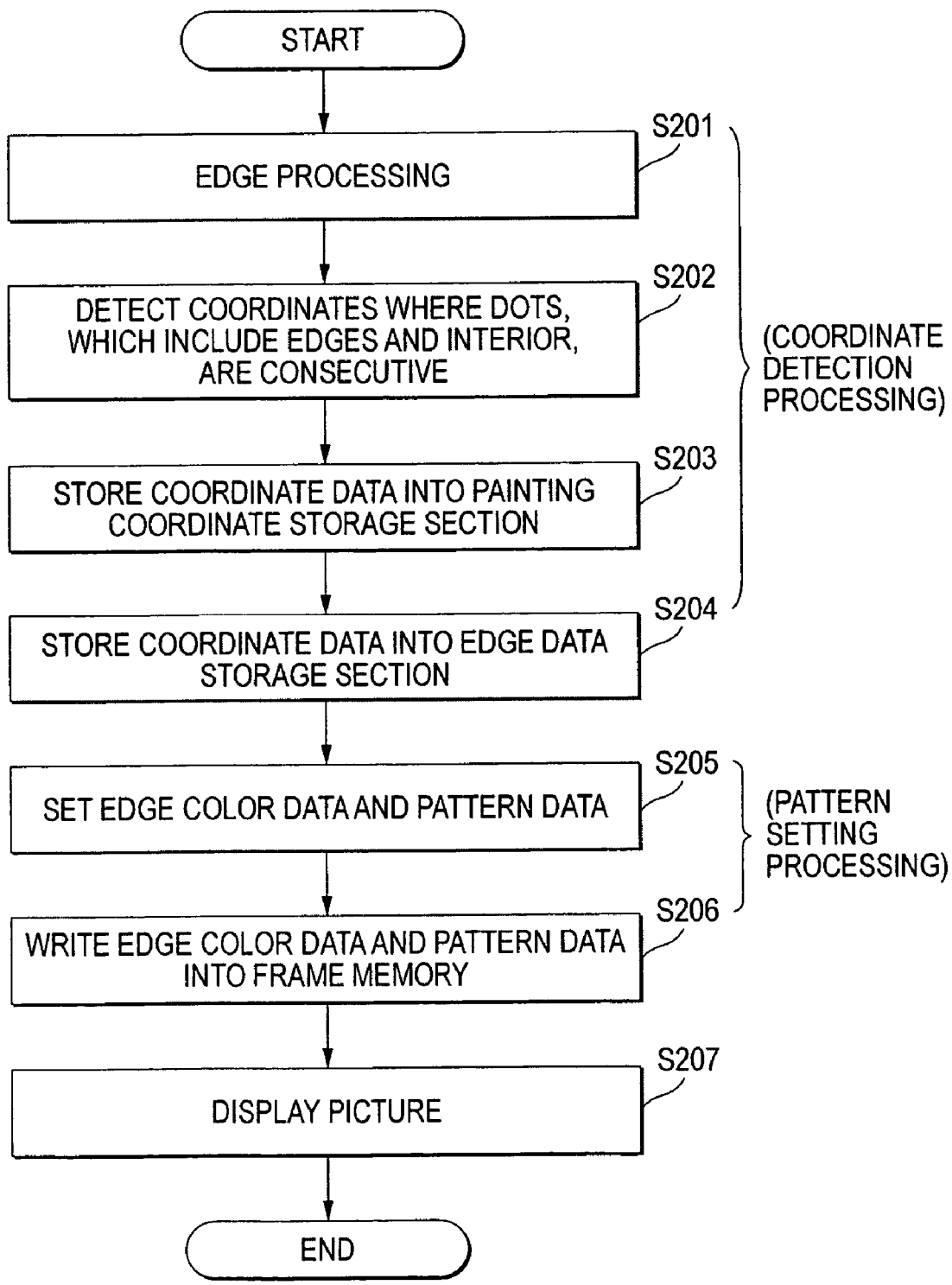
FIG. 13 is a timing chart showing procedures of rendering processing of the patterned polygon rendering apparatus of the fifth embodiment of the present invention.

FIG. 13 is a flowchart showing procedures of rendering operation of the patterned polygon rendering apparatus of the fifth embodiment of the present invention.

Initially, the edge dot attribute setting section 1 performs edge processing of an arbitrary picture (step S201). Next, the painting coordinate detection section 11 scans the inside of a rectangle circumscribing the picture to be painted, along the positive direction of the X-coordinate axis on each set of Y coordinates; sequentially pays attention to a plurality of scan lines in the direction of the X-coordinate axis; sets an internal attribute dot to all the dots, excluding the vertical attribute dot and the horizontal attribute dot, among the dots located between an odd-numbered vertical attribute dot and the next even-numbered vertical attribute dot, both of which are located in the scan line of interest; and detects coordinates of both ends of a plurality of dots where the vertical attribute dots, the horizontal attribute dots, and the internal attribute dots are consecutively present in the scanning direction (step S202). The left end is stored in the painting coordinate storage section 12 as rendering start coordinates and the right end is stored as rendering end coordinates (step S203).

For instance, in the case of a scan line SL shown in FIG. 5, the rendering start coordinates assume (1, 5), and the rendering end coordinates assume (8, 5). The edge data on the work memory 2, which correspond to the rendering start coordinates and the rendering end coordinates, are stored in the edge data storage section 13 (step S204). Coordinate detection processing is performed from step S202 to step S204.

Accordingly, when the picture to be rendered does not need an edge color, storing the edge data is not required. Moreover, the painting coordinate storage section 12 and the edge data storage section 13 may store a plurality of sets of data. Moreover, the data for which the internal attribute dots have been set do not need to be stored in the work memory 2.

The pattern setting section 14 fetches the rendering start coordinates and the rendering end coordinates, both of which are stored in the painting coordinate storage section 12; and reads pattern data from the pattern memory 5 by means of using the rendering start coordinates as reference coordinates of the two-dimensional address of the pattern memory 5. Moreover, the edge data corresponding to the rendering start coordinates and the rendering end coordinates are fetched from the edge data storage section 13, and the edge color data are set for the dots corresponding to the vertical attribute dots and the horizontal attribute dots (step S205). The edge color data are written into the address corresponding to the coordinates of the rendering target in the frame memory 6 along with the pattern data (step S206). Specifically, pattern setting processing is performed in steps S205 and S206. Finally, the display 7 displays a picture on the basis of the color data stored in the frame memory 6 (step S207).

Making reference to the pattern memory 5 and writing data into the frame memory 6 is performed on the basis of the thus-interpolated coordinates while coordinates between the rendering start coordinates and the rendering end coordinates are being interpolated. After rendering has been performed up to the rendering end coordinates, the next data are acquired from the painting coordinate storage section 12 and the edge data storage section 13. An offset value is used for the two-dimensional address when reference is made to the pattern memory 5 from the rendering start coordinates or the interpolated coordinates. As a result, restrictions on coincidence between the rendering position on the frame memory 6 and the pattern position are eliminated, so that rendering can be performed at an arbitrary pattern position. The offset value may be set in accordance with, e.g., a rendering command, or set from an external CPU.

So long as the painting coordinate detection section 11 clears the work memory 2 by reference to the same, edge processing of the next picture to be rendered can be started promptly.

As mentioned above, according to the present embodiment, there is no necessity for setting a pattern by again making reference to the work memory after the internal attribute dot has been set and stored in the work memory, and hence a patterned polygon can be rendered at high speed.

Sixth Embodiment

Figure 14:
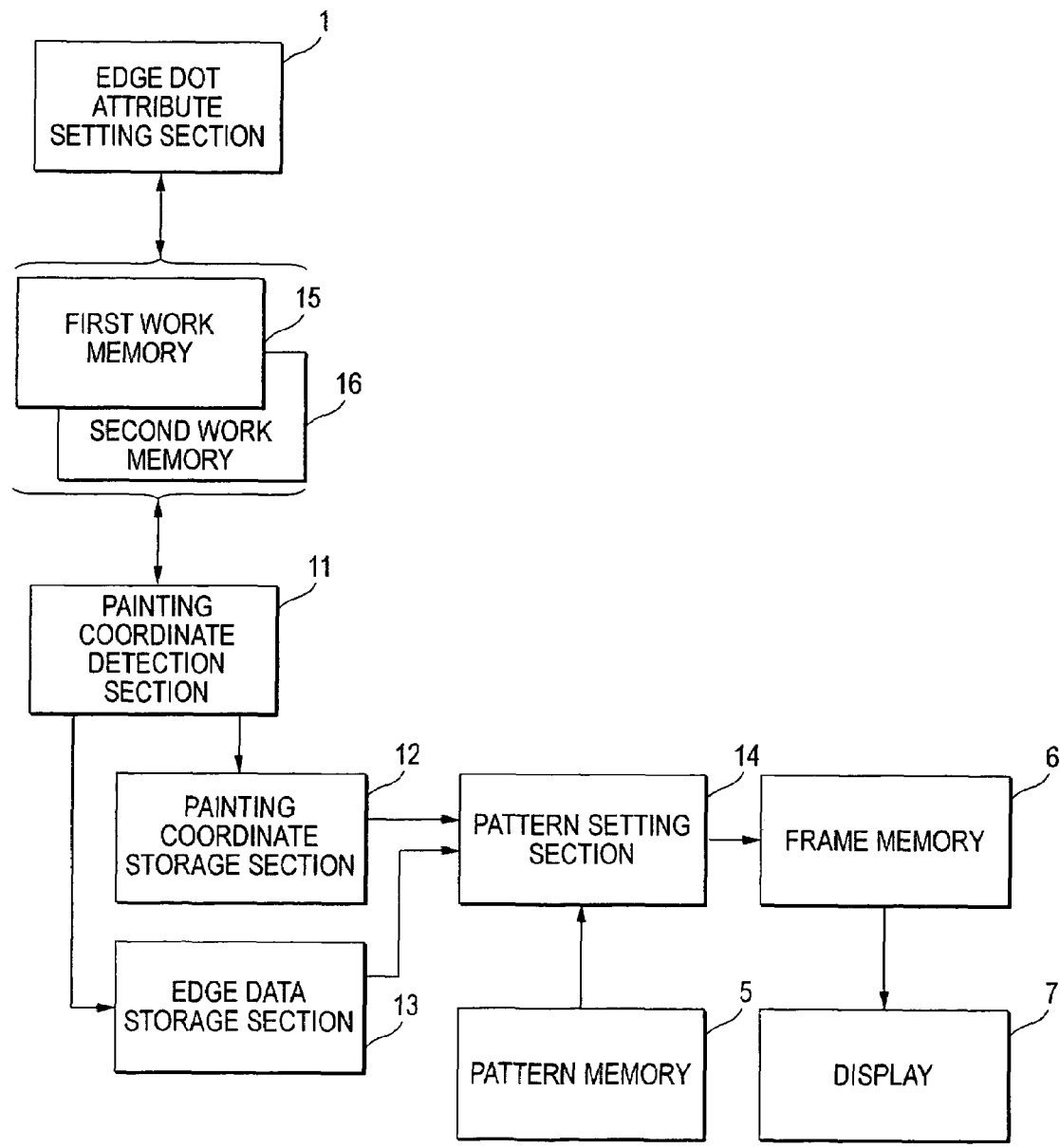
FIG. 14 is a block diagram showing the configuration of a patterned polygon rendering apparatus of a sixth embodiment of the present invention.

There will now be described a patterned polygon rendering apparatus which performs rendering processing through use of two types of work memory with the configuration described in connection with the fifth embodiment. FIG. 14 is a block diagram showing the configuration of a patterned polygon rendering apparatus of a sixth embodiment of the present invention. The present embodiment differs from the fifth embodiment in that the work memory 2 is increased to two pieces of work memory; namely, first work memory 15 and second work memory 16. The edge dot attribute setting section 1 and the painting coordinate detection section 11 can make access to the first work memory 15 and the second work memory 16. In other respects, the configuration of the patterned polygon rendering apparatus and procedures of rendering operation are identical with those of the fifth embodiment, and hence further explanation is omitted.

In the present embodiment, as a result of provision of two pieces of frame memory, rendering processing of two pictures can be performed in parallel. FIG. 15 is a timing chart showing the flow of rendering processing of the patterned polygon rendering apparatus of the sixth embodiment of the present invention.

First, the edge dot attribute setting section 1 performs edge processing of Picture A in relation to the first work memory 15 (T401).

Next, in relation to the first work memory 15 that has completed edge processing of Picture A, the painting coordinate detection section 11 detects the rendering start coordinates and the rendering end coordinates of Picture A while performing scanning operation, and stores the thus-detected coordinates into the painting coordinate storage section 12. The edge data in the first work memory 15, which correspond to the rendering start coordinates and the rendering end coordinates, are stored in the edge data storage section 13 (T402). The pattern setting section 14 performs pattern setting processing for consecutively fetching the rendering start coordinates, the rendering end coordinates, and the edge data; setting the edge color data and the pattern data to the respective dots constituting Picture A; and writing the data into the frame memory 6 (T402). A round of rendering processing of Picture A is now completed. Simultaneously, the edge dot attribute setting section 1 performs edge processing of Picture B in relation to the second work memory 16 (T402).

In relation to the second work memory 16 that has completed edge processing of Picture B, the painting coordinate detection section 11 detects the rendering start coordinates and rendering end coordinates of Picture B while performing scanning, and stores the thus-detected coordinates into the painting coordinate storage section 12. The edge data in the second work memory 16, which correspond to these rendering start coordinates and rendering end coordinates, are stored in the edge data storage section 13 (T403). The pattern setting section 14 consecutively fetches the rendering start coordinates, the rendering end coordinates, and the edge data, to thus perform pattern setting processing of Picture B (T403). A round of rendering processing of Picture B is now completed. Concurrently, the edge dot attribute setting section 1 performs edge processing of Picture C in relation to the first work memory 15 (T403).

In subsequent steps, rendering processing of two pictures is concurrently performed in parallel along the same flow.

So long as the painting coordinate detection section 11 clears the first work memory 15 and the second work memory 16 while making reference to the first work memory 15 and the second work memory 16, edge processing of the next picture to be rendered can be commenced promptly.

As described above, according to the present embodiment, two pictures can be processed in parallel through use of two pieces of work memory, so that a patterned polygon can be rendered at high speed.

As mentioned above, according to the present invention, a patterned polygon can be rendered at high speed. Accordingly, for instance, a car navigation system speeds up display of a map and enables prompt scrolling of the map, or the like.

The present invention obviates a necessity for processing of dividing a polygon into smaller polygons and processing of computing reference coordinates of patterns assigned to the smaller polygons, which have hitherto been required, and the transfer length over which data are written into memory is not divided into a shorter length, as well. Therefore, the present invention yields an advantage of the ability to render a patterned polygon at high speed, and is useful for a patterned polygon rendering apparatus, or the like, which effects rendering by pasting patterns to polygons of arbitrary shape, in the field of computer graphics.

What is claimed is:

1. A patterned polygon rendering apparatus, comprising:
    attribute dot setting processing means, which performs edge processing by means of assigning an attribute dot, indicating an edge of a polygon, to respective dots located on the outline of the polygon and storing the assigned attribute dots into work memory on a per-dot basis and which performs painting processing by means of assigning an attribute dot, indicating the inside of the polygon, to respective dots located in an internal region of the polygon by reference to the work memory and storing the assigned attribute dots into the work memory; and
    pattern setting processing means for performing pattern setting processing by means of setting edge color data for the dots assigned the attribute dots indicating the outline of the polygon, by reference to the work memory and setting pattern data to the dots assigned the attribute dots indicating the inside of the polygon, to thus render the data stored in the work memory in frame memory, wherein:
    the attribute dot setting processing means and the pattern setting processing means perform processing of a plurality of pictures in parallel through use of a plurality of pieces of work memory,
    the attribute dot setting processing means performs painting processing of a first picture from among the plurality of pictures in relation to a first work memory from among the plurality of pieces of work memory while the attribute dot setting processing means concurrently performs edge processing of a second picture from among the plurality of pictures in relation to a second work memory from among the plurality of pieces of work memory,
    the pattern setting processing means performs pattern setting processing of the first picture in relation to the first work memory while the attribute dot setting processing means concurrently performs painting processing of the second picture in relation to the second work memory, and
    the attribute dot setting processing means performs edge processing of a third picture from among the plurality of pictures in relation to the first work memory while the pattern setting processing means concurrently performs pattern setting processing of the second picture in relation to the second memory.

2. The patterned polygon rendering apparatus according to claim 1, further comprising:
    the first work memory for effecting the edge processing; and
    the second work memory for effecting the painting processing and the pattern setting processing, wherein
    the second work memory processes dots constituting the outline of the polygon and dots constituting the inside of the polygon as one bit per dot.

3. The patterned polygon rendering apparatus according to claim 2, wherein the attribute dot setting processing means and the pattern setting means clear the work memory while scanning the work memory when making reference to the work memory in the painting processing and the pattern setting processing.

* * * * *

UNITED STATES PATENT AND TRADEMARK OFFICE
CERTIFICATE OF CORRECTION

| | | |
|---|---|---|
| PATENT NO. | : 7,667,714 B2 | Page 1 of 1 |
| APPLICATION NO. | : 11/342876 | |
| DATED | : February 23, 2010 | |
| INVENTOR(S) | : Satoshi Shigenaga | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1060 days.

Signed and Sealed this

Twenty-eighth Day of December, 2010

David J. Kappos
*Director of the United States Patent and Trademark Office*